(12) United States Patent
Ahn et al.

(10) Patent No.: US 11,934,079 B2
(45) Date of Patent: Mar. 19, 2024

(54) ELECTROCHROMIC DEVICE

(71) Applicant: SKC CO., LTD., Gyeonggi-do (KR)

(72) Inventors: Byeong Uk Ahn, Gyeonggi-do (KR); Yong Sang La, Gyeonggi-do (KR); Seong Hwan Lee, Gyeonggi-do (KR); Il Hwan Yoo, Gyeonggi-do (KR)

(73) Assignee: SKC CO., LTD., Gyeonggi-Do (KR)

( * ) Notice: Subject to any disclaimer, the term of this patent is extended or adjusted under 35 U.S.C. 154(b) by 70 days.

(21) Appl. No.: 17/383,815

(22) Filed: Jul. 23, 2021

(65) Prior Publication Data

US 2022/0066275 A1 Mar. 3, 2022

(30) Foreign Application Priority Data

Sep. 1, 2020 (KR) .................. 10-2020-0111233

(51) Int. Cl.
*G02F 1/1514* (2019.01)
*G02F 1/15* (2019.01)
*G02F 1/1516* (2019.01)
*G02F 1/153* (2006.01)

(52) U.S. Cl.
CPC ........ *G02F 1/1514* (2019.01); *G02F 1/15165* (2019.01); *G02F 1/1533* (2013.01); *G02F 2001/164* (2019.01)

(58) Field of Classification Search
CPC .. G02F 1/1514; G02F 1/15165; G02F 1/1533; G02F 2001/164; G02F 1/155
See application file for complete search history.

(56) References Cited

U.S. PATENT DOCUMENTS

| 2002/0196519 | A1 | 12/2002 | Elkadi et al. |
| 2009/0052006 | A1* | 2/2009 | Xu ........................ G02F 1/1533 |
| | | | 359/275 |
| 2012/0224247 | A1 | 9/2012 | Sotzing et al. |
| 2019/0145161 | A1* | 5/2019 | Agrawal ................... E06B 9/24 |
| | | | 359/275 |

(Continued)

FOREIGN PATENT DOCUMENTS

| CN | 211786514 U | * 10/2020 |
| JP | 2003-050406 A | 2/2003 |
| KR | 10-2010-0127987 A | 12/2010 |

(Continued)

OTHER PUBLICATIONS

Park et al. "A skin-integrated transparent and stretchable strain sensor with interactive color-changing electrochromic displays" Nanoscale, vol. 9, pp. 7631-7640 (Year: 2017).*

(Continued)

*Primary Examiner* — George G. King
(74) *Attorney, Agent, or Firm* — IP & T GROUP LLP

(57) ABSTRACT

The embodiments relate to an electrochromic device having excellent elongation and tensile strength while achieving an excellent light transmission variable function based on the electrochromic principle. The electrochromic device comprises a light transmission variable structure interposed between a first base layer and a second base layer, wherein the light transmission variable structure comprises a first chromic layer and a second chromic layer, an electrolyte layer is interposed between the first chromic layer and the second chromic layer, and the elongation is 60% to 170%.

8 Claims, 3 Drawing Sheets

(56) References Cited

U.S. PATENT DOCUMENTS

2020/0142246 A1    5/2020  Gim et al.

FOREIGN PATENT DOCUMENTS

| KR | 10-1862200 | 7/2018 |
| KR | 10-2018-0121425 A | 11/2018 |
| KR | 10-2018-0129161 A | 12/2018 |
| KR | 10-2019-0037553 A | 4/2019 |

OTHER PUBLICATIONS

Kim et al. "Design of intrinsically stretchable and highly conductive polymers for fully stretchable electrochromic devices" Scientific reports, 10:16488 (Year: 2020).*

Kim et al. "Low power stretchable active-matrix red, green, blue (RGB) electrochromic device array of poly(3-methylthiophene)/Prussian blue" Applied Surface Science, vol. 471, pp. 300-308 (Year: 2019).*

Cai et al. "Next-Generation Multifunctional Electrochromic Devices" Accounts of Chemical Research, vol. 49, pp. 1469-1476 (Year: 2016).*

* cited by examiner

[Fig. 1]
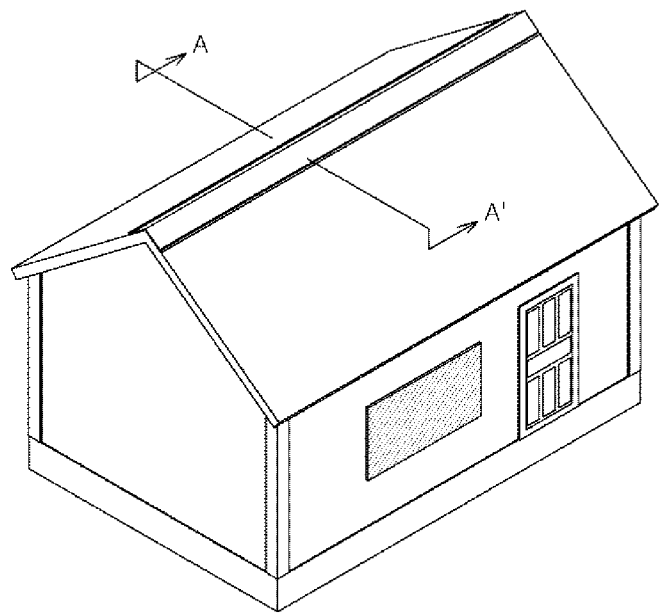
[Fig. 2]
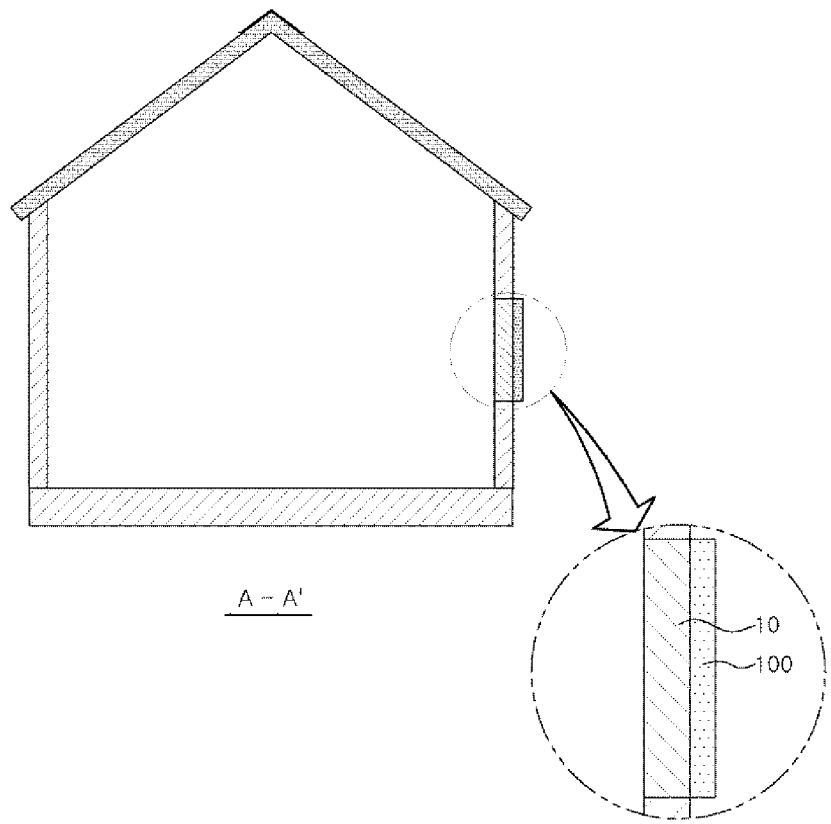
A – A'

[Fig. 3]
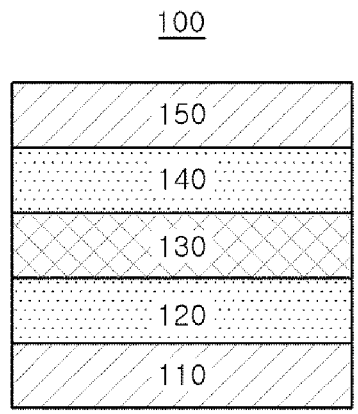
[Fig. 4]
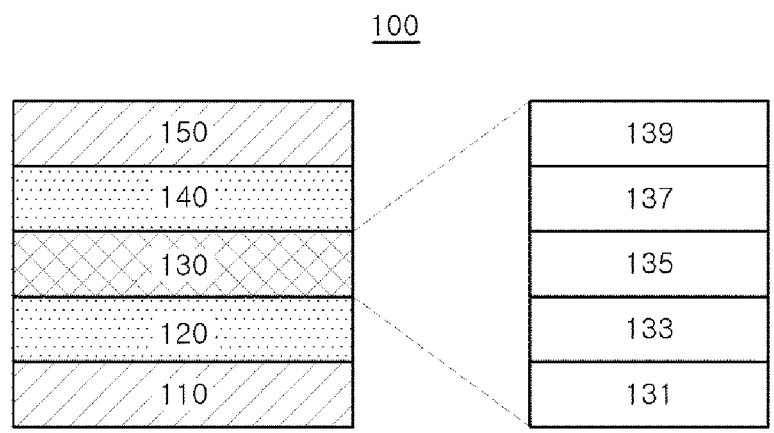
[Fig. 5]
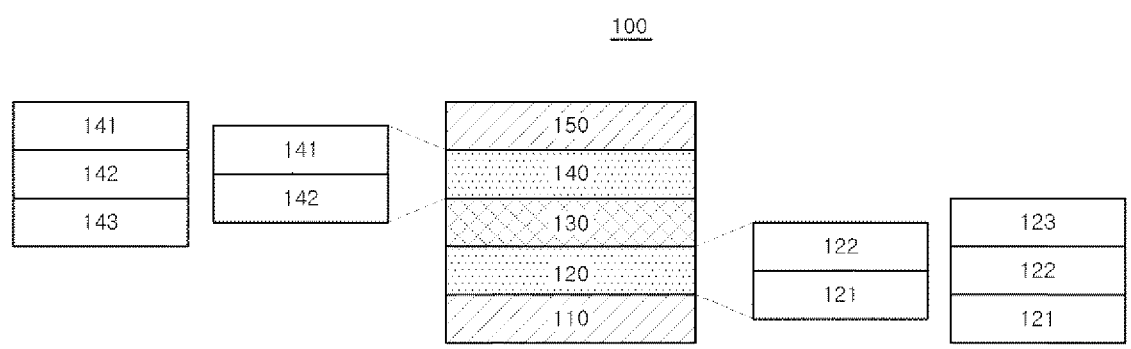

[Fig. 6]
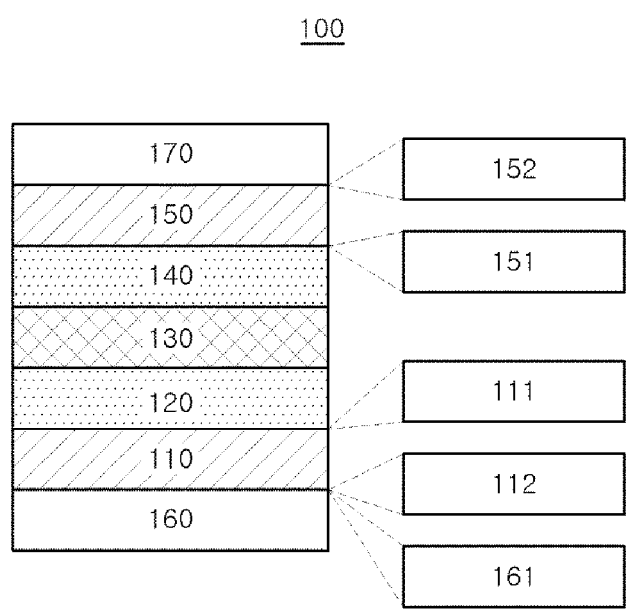

ELECTROCHROMIC DEVICE

The present application claims priority of Korean patent application number 10-2020-0111233 filed on Sep. 1, 2020. The disclosure of each of the foregoing applications is incorporated herein by reference in its entirety.

TECHNICAL FIELD

Embodiments relate to an electrochromic device having excellent elongation and tensile strength while achieving an excellent light transmission variable function based on the electrochromic principle.

BACKGROUND ART

In recent years, as interest in environmental protection has increased, interest in technologies that enhance energy efficiency is also increasing. As an example, research and development on technologies such as smart windows and energy harvesting are being actively conducted. A smart window among them refers to an active control technology that adjusts the degree of transmission of light coming from the outside to enhance energy efficiency and to provide a pleasant environment to the users. It is a fundamental technology that can be commonly applied to various industrial fields. A smart window is based on electrochromism. Electrochromism is a phenomenon in which an electrochemical oxidation or reduction reaction takes place as electric power is applied, and an inherent color or optical properties such as light transmittance of an electrochromically active material are changed accordingly.

Currently, a glass-type smart window is generally used in which an electrochromic device is applied between several sheets of glass. However, its manufacturing process is complicated, and the product price is very high since the size of the product is to be tailored to the size of a window to be constructed, so that there are difficulties in commercializing it. In addition, there are also problems in that if a silicone finish is applied, moisture may penetrate, resulting in a risk of a short circuit, that it occupies a lot of storage space during logistics transportation, and that it is fragile to external impact and thus dangerous due to the nature of the material.

Thus, there has been a continuous demand for research on a smart window that is capable of solving the above problems and achieving an excellent light transmission variable function.

PRIOR ART DOCUMENT (Patent Document 1) Korean Patent No. 1862200 (May 23, 2018)

DISCLOSURE OF INVENTION

Technical Problem

The embodiments aim to provide an electrochromic device having excellent elongation and tensile strength while achieving an excellent light transmission variable function based on the electrochromic principle.

Solution to Problem

The electrochromic device according to an embodiment comprises a light transmission variable structure interposed between a first base layer and a second base layer, wherein the light transmission variable structure comprises a first chromic layer and a second chromic layer, an electrolyte layer is interposed between the first chromic layer and the second chromic layer, and the elongation is 60% to 170%.

Advantageous Effects of Invention

The electrochromic device according to an embodiment achieves a light transmission variable function based on the electrochromic principle while securing mechanical properties with flexibility. Thus, it is possible to overcome the limitations in the prior art that it had to be applied only in a firm structure and to secure a desired technical means simply by attaching it to a structure such as a conventional transparent window.

Specifically, the electrochromic device has the characteristic that the light transmittance is reversibly changed when electricity is applied. Thus, it is possible to selectively control the transmittance of sunlight and the like with such a simple operation as pressing a button, whereby the energy efficiency can be enhanced.

In particular, as the electrochromic device is flexible and has excellent elongation and tensile strength, even when the device is warped or bent, deformation or cracks would not occur in the electrode layer or the chromic layer, and the chromic performance would not be affected.

As a result, the electrochromic device can be applied to a curved window without a deterioration in performance. It has excellent workability as it can be easily cut and attached to fit various window sizes.

In addition, since the electrochromic device can achieve at least a certain level of light transmission variable performance even at high temperatures, it can be readily applied to a window without a deterioration of the device even in a season receiving very high solar energy.

Further, since the electrochromic device secures excellent flexibility and high mechanical strength, it can be maintained in the form of a roll having a small radius of curvature, thereby reducing logistics costs thanks to the efficient use of storage space, and it is very convenient for storage and transportation.

BRIEF DESCRIPTION OF DRAWINGS

FIG. 1 is a perspective view conceptually showing a window to which an electrochromic device according to an embodiment is applied.

FIG. 2 is a cross-sectional view taken along line A-A' in FIG. 1 and an enlarged view thereof.

FIG. 3 schematically shows a cross-section of an electrochromic device according to an embodiment.

FIG. 4 schematically shows a cross-section of an electrochromic device and a light transmission variable structure according to an embodiment.

FIG. 5 schematically shows a cross-section of an electrochromic device and a barrier layer according to an embodiment.

FIG. 6 schematically shows a cross-section of an electrochromic device according to an embodiment.

EXPLANATION OF REFERENCE NUMERALS

A-A': cutting line
10: window
100: electrochromic device
110: first base layer 111: first-A primer layer
112: first-B primer layer
120: first barrier layer
121: first-A barrier layer
122: first-B barrier layer
123: first-C barrier layer
130: light transmission variable structure
131: first electrode layer
133: first chromic layer
135: electrolyte layer
137: second chromic layer
139: second electrode layer
140: second barrier layer
141: second-A barrier layer
142: second-B barrier layer
143: second-C barrier layer
150: second base layer
151: second-A primer layer
152: second-B primer layer
160: release film layer
161: adhesive layer
170: hard coat layer

BEST MODE FOR CARRYING OUT THE INVENTION

Hereinafter, the embodiments will be described in detail with reference to the accompanying drawings so that those of ordinary skill in the art to which the present invention pertains can easily practice them. However, the embodiments may be implemented in various different forms and are not limited to the embodiments described in the present specification.

In the present specification, in the case where each film, window, panel, structure, or layer is mentioned to be formed "on" or "under" another film, window, panel, structure, or layer, it means not only that one element is directly formed on or under another element, but also that one element is indirectly formed on or under another element with other element(s) interposed between them.

In addition, the term on or under with respect to each element may be referenced to the drawings. For the sake of description, the sizes of individual elements in the appended drawings may be exaggeratedly depicted and do not indicate the actual sizes. In addition, the same reference numerals refer to the same elements throughout the specification.

Throughout the present specification, when a part is referred to as "comprising" an element, it is understood that other elements may be comprised, rather than other elements are excluded, unless specifically stated otherwise.

In the present specification, a singular expression is understood to encompass a singular or plural expression, interpreted in context, unless otherwise specified.

In addition, all numbers and expressions relating to quantities of components, reaction conditions, and the like used herein are to be understood as being modified by the term "about" unless specifically stated otherwise.

Throughout the present specification, the terms first, second, and the like are used to describe various components. But the components should not be limited by the terms. The terms are used for the purpose of distinguishing one component from another.

Electrochromic Device

An embodiment provides an electrochromic device having excellent elongation and tensile strength while achieving an excellent light transmission variable function based on the electrochromic principle.

The electrochromic device (100) according to an embodiment comprises a light transmission variable structure (130) interposed between a first base layer (110) and a second base layer (150), wherein the light transmission variable structure (130) comprises a first chromic layer (133) and a second chromic layer (137), and an electrolyte layer (135) is interposed between the first chromic layer (133) and the second chromic layer (137) (see FIGS. 3 and 4).

The electrochromic device (100) may have an elongation of 60% and 170%.

The elongation is expressed as a percentage of how much the material is stretched based on the point at which the material is broken during a tensile test of the material. Specifically, the elongation may be a value (unit: %) determined by the equation of $[(L_1-L_0)/L_0] \times 100(\%)$ when the initial gage distance of a sample is $L_0$ and the gage distance upon breakage is $L_1$. More specifically, it may be measured according to the ASTM D 638 standard.

Specifically, the elongation of the electrochromic device (100) may be 60% to 150%, 60% to 140%, 70% to 150%, 80% to 150%, or 80% to 140%, but it is not limited thereto.

The electrochromic device (100) may have a tensile strength of 120 kgf/mm$^2$ to 350 kgf/mm$^2$.

The tensile strength is a value (unit: kgf/mm$^2$) determined by dividing the maximum tensile load until the sample is broken during a tensile test of the material by the cross-sectional area of the sample before the test. More specifically, it may be measured according to the ASTM D 638 standard.

For example, the tensile strength of the electrochromic device (100) may be 120 kgf/mm$^2$ to 320 kgf/mm$^2$, 150 kgf/mm$^2$ to 320 kgf/mm$^2$, 180 kgf/mm$^2$ to 320 kgf/mm$^2$, 200 kgf/mm$^2$ to 320 kgf/mm$^2$, or 210 kgf/mm$^2$ to 350 kgf/mm$^2$, but it is not limited thereto.

If the elongation and tensile strength of the electrochromic device (100) are within the above ranges, no cracks are formed in the electrode layer or chromic layer when the device is bent, high mechanical strength is secured, whereby its performance would not be deteriorated even when maintained in the form of a roll having a small radius of curvature, and appropriate flexibility can be secured as a flexible electrochromic device.

On the other hand, if the elongation of the electrochromic device (100) is less than the above range or the tensile strength thereof is greater than the above range, its flexibility, which is the main characteristic, is significantly reduced or little exhibited when applied as a flexible electrochromic device, and whitening such as white streaks may occur at the bent boundary when forced to be bent.

In addition, if the elongation of the electrochromic device (100) is greater than the above range or the tensile strength thereof is less than the above range, it is so flexible that the film can be easily bent, whereby cracks may be formed in the electrode layer or chromic layer, and the pieces may be broken and detached in severe cases.

Base Layer

The first base layer (110) and the second base layer (150) are layers for maintaining transparency and durability and comprise a polymer resin.

Specifically, the first base layer and the second base layer may each comprise one or more selected from the group consisting of polyethylene terephthalate (PET), polyethylene naphthalate (PEN), polycarbonate (PC), polyimide (PI), polycyclohexylenedimethylene terephthalate (PCT), polyethersulfone (PES), nylon, polymethyl methacrylate (PMMA), and cycloolefin polymer (COP), but it is not limited thereto. More specifically, the first base layer and the second base layer may each comprise polyethylene terephthalate (PET).

As the first base layer and the second base layer comprise the polymer resin described above, it is possible to achieve an electrochromic device having both durability and flexibility.

The first base layer and the second base layer may each have a light transmittance of 80% or more for light having a wavelength of 550 nm. Specifically, the first base layer and the second base layer may each have a light transmittance of 85% or more or 90% or more for light having a wavelength of 550 nm.

The first base layer and the second base layer may each have a haze of less than 2.0%, 1.8% or less, or 1.5% or less.

The first base layer and the second base layer may each have an elongation of 80% or more. Specifically, the first base layer and the second base layer may each have an elongation of 90% or more, 100% or more, or 120% or more.

As the first base layer and the second base layer each satisfy a light transmittance and a haze in the above ranges, the transparency can be enhanced. As they satisfy an elongation in the above range, the flexibility can be enhanced.

The first base layer may have a thickness of 50 μm to 180 μm.

Specifically, the thickness of the first base layer may be 70 μm to 180 μm, 80 μm to 180 μm, 100 μm to 180 μm, 100 μm to 170 μm, or 100 μm to 150 μm, but it is not limited thereto.

The second base layer may have a thickness of 50 μm to 180 μm.

Specifically, the thickness of the second base layer may be 70 μm to 180 μm, 80 μm to 180 μm, 100 μm to 180 μm, 100 μm to 170 μm, or 100 μm to 150 μm, but it is not limited thereto.

If the first base layer and the second base layer have a thickness satisfying the above ranges, it is advantageous for achieving a specific level of elongation and tensile strength of the electrochromic device, as well as advantageous for preventing cracks in each layer when the electrochromic device is bent and for obtaining an electrochromic device that is thin, lightweight, and flexible.

Barrier Layer

The barrier layers (the first barrier layer and the second barrier layer) serve to prevent the penetration of impurities including moisture or gas into the light transmission variable structure from the outside.

The first barrier layer (120) and the second barrier layer (140) may each comprise two or more layers. Specifically, the first barrier layer (120) and the second barrier layer (140) may each comprise two layers or three layers (see FIG. 5).

For example, the first barrier layer (120) may comprise two layers, and the second barrier layer (140) may comprise two layers. Alternatively, the first barrier layer (120) may comprise three layers, and the second barrier layer (140) may comprise three layers.

In an embodiment, the first barrier layer (120) may comprise a first-A barrier layer (121) and a first-B barrier layer (122), or the first barrier layer (120) may comprise a first-A barrier layer (121), a first-B barrier layer (122), and a first-C barrier layer (123) (see FIG. 5).

Specifically, the first barrier layer may have a structure in which a first-A barrier layer and a first-B barrier layer are sequentially laminated; or a structure in which a first-A barrier layer, a first-B barrier layer, and a first-C barrier layer are sequentially laminated.

The first barrier layer may be laminated on the first base layer.

In an embodiment, the second barrier layer (140) may comprise a second-A barrier layer (141) and a second-B barrier layer (142), or the second barrier layer (140) may comprise a second-A barrier layer (141), a second-B barrier layer (142), and a second-C barrier layer (143) (see FIG. 5).

Specifically, the second barrier layer may have a structure in which a second-A barrier layer and a second-B barrier layer are sequentially laminated; or a structure in which a second-A barrier layer, a second-B barrier layer, and a second-C barrier layer are sequentially laminated.

The second barrier layer may be laminated under the second base layer.

In an embodiment, the first barrier layer (120) may comprise a first-A barrier layer (121) and a first-B barrier layer (122), and the second barrier layer (140) may comprise a second-A barrier layer (141) and a second-B barrier layer (142). In another embodiment, the first barrier layer (120) may comprise a first-A barrier layer (121), a first-B barrier layer (122), and a first-C barrier layer (123), and the second barrier layer (140) may comprise a second-A barrier layer (141) and a second-B barrier layer (142).

The first barrier layer (120) and the second barrier layer (140) may each comprise at least one selected from the group consisting of metal oxides, metal nitrides, metal oxynitrides, metalloid oxides, metalloid nitrides, metalloid oxynitrides, and combinations thereof.

Specifically, the first barrier layer (120) and the second barrier layer (140) may each comprise at least one selected from the group consisting of metal nitrides, metal oxynitrides, metalloid nitrides, metalloid oxynitrides, and combinations thereof.

More specifically, the first barrier layer (120) and the second barrier layer (140) may each comprise a metal nitride or a metalloid nitride.

In an embodiment, the first barrier layer (120) may comprise a first-A barrier layer (121) and a first-B barrier layer (122), wherein one of the first-A barrier layer and the first-B barrier layer may comprise a metal oxide or a metalloid oxide, and the other may comprise a metal nitride or a metalloid nitride.

The first barrier layer (120) may further comprise a first-C barrier layer (123). In such a case, the first-C barrier layer may comprise an acrylic-based resin, an epoxy-based resin, a silicone-based resin, a polyimide-based resin, or a polyurethane-based resin.

In addition, the second barrier layer (140) may comprise a second-A barrier layer (141) and a second-B barrier layer (142), wherein one of the second-A barrier layer and the second-B barrier layer may comprise a metal oxide or a metalloid oxide, and the other may comprise a metal nitride or a metalloid nitride.

The second barrier layer (140) may further comprise a second-C barrier layer (143). In such a case, the second-C barrier layer may comprise an acrylic-based resin, an epoxy-based resin, a silicone-based resin, a polyimide-based resin, or a polyurethane-based resin.

In another embodiment, the first barrier layer may comprise a first-A barrier layer and a first-B barrier layer, wherein the thickness ratio of the first-A barrier layer and the first-B barrier layer may be 1:2 to 1:10. In such a case, the first-A barrier layer may comprise a metal nitride or a metalloid nitride, and the first-B barrier layer may comprise a metal oxide or a metalloid oxide.

The thickness ratio of the first-A barrier layer and the first-B barrier layer may be 1:2.5 to 1:7.5, but it is not limited thereto.

In addition, the second barrier layer comprises a second-A barrier layer and a second-B barrier layer, wherein the thickness ratio of the second-A barrier layer and the second-B barrier layer may be 1:2 to 1:10. In such a case, the second-A barrier layer may comprise a metal nitride or a metalloid nitride, and the second-B barrier layer may comprise a metal oxide or a metalloid oxide.

The thickness ratio of the second-A barrier layer and the second-B barrier layer may be 1:2.5 to 1:7.5, but it is not limited thereto.

As the thickness ratio of the first-A barrier layer and the first-B barrier layer and the thickness ratio of the second-A barrier layer and the second-B barrier layer satisfy the above ranges, there is an effect that long-term reliability such as optical properties, refractive index, and weatherability of a film are improved.

On the other hand, if the thickness ratio of the first-A barrier layer and the first-B barrier layer or the thickness ratio of the second-A barrier layer and the second-B barrier layer is outside the above range, the refractive index may be decreased, it becomes opaque, or long-term reliability such as optical properties and weatherability may be decreased.

In an embodiment, the first barrier layer may comprise a first-A barrier layer and a first-B barrier layer, wherein the first base layer, the first-A barrier layer, and the first-B barrier layer may be sequentially laminated, the first-A barrier layer may comprise a metal nitride or a metalloid nitride, and the first-B barrier layer may comprise a metal oxide or a metalloid oxide.

In another embodiment, the first barrier layer may comprise a first-A barrier layer, a first-B barrier layer, and a first-C barrier layer, wherein the first base layer, the first-A barrier layer, the first-B barrier layer, and the first-C barrier layer may be sequentially laminated, the first-A barrier layer may comprise a metal nitride or a metalloid nitride, the first-B barrier layer may comprise a metal oxide or a metalloid oxide, and the first-C barrier layer may comprise an acrylic-based resin, an epoxy-based resin, a silicone-based resin, a polyimide-based resin, or a polyurethane-based resin.

In such a case, the first-A barrier layer may have a thickness of 10 nm to 50 nm, 10 nm to 40 nm, or 10 nm to 30 nm, but it is not limited thereto.

In addition, the first-B barrier layer may have a thickness of 30 nm to 100 nm, 30 nm to 80 nm, 30 nm to 70 nm, or 40 nm to 60 nm, but it is not limited thereto.

The first-A barrier layer and the first-B barrier layer may each have a moisture permeability of 0.2 g/day·m$^2$ or less, 0.15 g/day·m$^2$ or less, or 0.1 g/day·m$^2$ or less, but it is not limited thereto.

As the thickness range and moisture permeability of the second-A barrier layer and the second-B barrier layer satisfy the above ranges, there is an effect that long-term reliability such as optical properties, refractive index, and weatherability of a film are improved.

On the other hand, if they are outside the above ranges, the refractive index may be decreased, it becomes opaque, or long-term reliability such as optical properties and weatherability may be decreased.

In an embodiment, the second barrier layer may comprise a second-A barrier layer and a second-B barrier layer, wherein the second base layer, the second-A barrier layer, and the second-B barrier layer may be sequentially laminated, the second-A barrier layer may comprise a metal nitride or a metalloid nitride, and the second-B barrier layer comprises a metal oxide or a metalloid oxide.

In another embodiment, the second barrier layer may comprise a second-A barrier layer, a second-B barrier layer, and a second-C barrier layer, wherein the second base layer, the second-A barrier layer, the second-B barrier layer, and the second-C barrier layer may be sequentially laminated, the second-A barrier layer may comprise a metal nitride or a metalloid nitride, the second-B barrier layer comprises a metal oxide or a metalloid oxide, and the second-C barrier layer may comprise an acrylic-based resin, an epoxy-based resin, a silicone-based resin, a polyimide-based resin, or a polyurethane-based resin.

In such a case, the second-A barrier layer may have a thickness of 10 nm to 50 nm, 10 nm to 40 nm, or 10 nm to 30 nm, but it is not limited thereto.

In addition, the second-B barrier layer may have a thickness of 30 nm to 100 nm, 30 nm to 80 nm, 30 nm to 70 nm, or 40 nm to 60 nm, but it is not limited thereto.

The second-A barrier layer and the second-B barrier layer may each have a moisture permeability of 0.2 g/day·m$^2$ or less, 0.15 g/day·m$^2$ or less, or 0.1 g/day·m$^2$ or less, but it is not limited thereto.

As the thickness range and moisture permeability of the second-A barrier layer and the second-B barrier layer satisfy the above ranges, there is an effect that long-term reliability such as optical properties, refractive index, and weatherability of a film are improved. On the other hand, if they are outside the above ranges, the refractive index may be decreased, it becomes opaque, or long-term reliability such as optical properties and weatherability may be decreased.

The moisture permeability of the first barrier layer may be the same as, or different from, that of the second barrier layer. Specifically, the moisture permeability of the first barrier layer may be different from that of the second barrier layer.

In a specific embodiment, the first barrier layer may comprise a first-A barrier layer and a first-B barrier layer, wherein the first base layer, the first-A barrier layer, and the first-B barrier layer may be sequentially laminated, the first-A barrier layer may comprise a silicon nitride (SiNx), and the first-B barrier layer may comprise a silicon oxide (SiOx). In addition, optionally, the first barrier layer may further comprise a first-C barrier layer comprising an acrylic-based resin.

When the first-A barrier layer comprises a silicon nitride, the ratio of Si:N may be 1.0:0.8 to 1.0:1.2, but it is not limited thereto. When the first-B barrier layer comprises a silicon oxide, the ratio of Si:O may be 1.0:1.7 to 1.0:2.3, but it is not limited thereto.

In addition, the second barrier layer may comprise a second-A barrier layer and a second-B barrier layer, wherein the second base layer, the second-A barrier layer, and the second-B barrier layer may be sequentially laminated, the second-A barrier layer may comprise a silicon nitride (SiNx), and the second-B barrier layer may comprise a silicon oxide (SiOx). In addition, optionally, the second barrier layer may further comprise a second-C barrier layer comprising an acrylic-based resin, an epoxy-based resin, a silicone-based resin, a polyimide-based resin, or a polyurethane-based resin.

When the second-A barrier layer comprises a silicon nitride, the ratio of Si:N may be 1.0:0.8 to 1.0:1.2, but it is not limited thereto. When the second-B barrier layer comprises a silicon oxide, the ratio of Si:O may be 1.0:1.7 to 1.0:2.3, but it is not limited thereto.

As the first barrier layer and the second barrier layer satisfy the above conditions, a desired performance can be achieved even with a thin thickness, and the prevention of moisture penetration can be maximized, whereby the durability and long-term stability of the electrochromic device can be enhanced.

The first barrier layer and the second barrier layer may be deposited on the first base layer and the second base layer by a vacuum deposition method, respectively. Specifically, the first barrier layer and the second barrier layer may be deposited on each of the first base layer and the second base layer by a sputtering method.

In such a case, the deposition raw material may be one or more of a metal or a metalloid, and the type is not particularly limited. For example, it may comprise at least one selected from magnesium (Mg), silicon (Si), indium (In), titanium (Ti), bismuth (Bi), germanium (Ge), and aluminum (Al).

The deposition reaction gas may comprise oxygen ($O_2$) gas or nitrogen ($N_2$) gas. If oxygen gas is used as the reaction gas, a barrier layer comprising a metal oxide or a metalloid oxide may be formed. If nitrogen gas is used as the reaction gas, a barrier layer comprising a metal nitride or a metalloid nitride may be formed. If oxygen gas and nitrogen gas are appropriately mixed and used as the reaction gas, a barrier layer comprising a metal oxynitride or a metalloid oxynitride may be formed.

The vacuum deposition method includes a physical vacuum deposition method and a chemical vacuum deposition method. The physical vacuum deposition method includes thermal vacuum deposition, E-beam vacuum deposition, and sputtering deposition.

The sputtering may be DC magnetron sputtering or AC magnetron sputtering.

The DC magnetron sputtering may be, specifically, plasma sputtering, for example, reactive plasma sputtering.

Light Transmission Variable Structure

The light transmission variable structure (130) may comprise a first electrode layer (131); a first chromic layer (133) on the first electrode layer (131); an electrolyte layer (135) on the first chromic layer (133); a second chromic layer (137) on the electrolyte layer (135); and a second electrode layer (139) on the second chromic layer (137) (see FIG. 4).

The light transmission variable structure (130) may be a structure in which a first electrode layer (131), a first chromic layer (133), an electrolyte layer (135), a second chromic layer (137), and a second electrode layer (139) are sequentially laminated. Specifically, the light transmittance variable structure is a laminate structure in which the light transmittance is reversibly changed when a predetermined voltage is applied.

Specifically, when a voltage is applied to the first electrode layer (131) and the second electrode layer (139), the overall light transmittance increases and then decreases due to specific ions or electrons that move from the second chromic layer (137) to the first chromic layer (133) through the electrolyte layer (135).

If the light transmittance of the second chromic layer (137) is decreased, the light transmittance of the first chromic layer (133) is also decreased. If the light transmittance of the second chromic layer (137) is increased, the light transmittance of the first chromic layer (133) is also increased.

The first electrode layer and the second electrode layer may each comprise a transparent electrode or a reflective electrode. In an embodiment, one of the first electrode layer and the second electrode layer may be a transparent electrode, and the other may be a reflective electrode. In another embodiment, both the first electrode layer and the second electrode layer may be transparent electrodes.

The first electrode layer (131) may be formed on the first barrier layer (120) by a sputtering deposition method. In addition, the second electrode layer (139) may be formed on the second barrier layer (140) by a sputtering deposition method.

The transparent electrode may be made of a material having high transmittance of light, low sheet resistance, and penetration resistance, and it may be formed in the shape of an electrode plate.

The transparent electrode may comprise one, for example, selected from the group consisting of indium-tin oxide (ITO), zinc oxide (ZnO), indium-zinc oxide (IZO), and combinations thereof.

The reflective electrode, for example, may comprise at least one selected from the group consisting of silver (Ag), aluminum (Al), copper (Cu), molybdenum (Mo), gold (Au), tungsten (W), chromium (Cr), and combinations thereof.

The first electrode layer (131) and the second electrode layer (139) may each have a thickness of 100 nm to 500 nm, 100 nm to 400 nm, 100 nm to 300 nm, or 150 nm to 250 nm, but it is not limited thereto.

The first electrode layer and the second electrode layer may each be a transparent electrode and comprise indium-tin oxide (ITO).

Specifically, the first electrode layer and the second electrode layer may each comprise indium oxide:tin oxide at a weight ratio of 70:30 to 98:2 or 80:20 to 97:3.

In addition, the first electrode layer and the second electrode layer may each have a surface resistance of 5 Ω/sq to 100 Ω/sq, 5 Ω/sq to 80 Ω/sq, 5 Ω/sq to 70 Ω/sq, or 5 Ω/sq to 50 Ω/sq, but it is not limited thereto.

The light transmittance of the first chromic layer (133) changes when a voltage is applied between the first electrode layer (131) and the second electrode layer (139). It can impart variability of light transmittance to the electrochromic device.

The first chromic layer (133) may comprise a material having a color development characteristic complementary to the electrochromic material contained in the second chromic layer (137). The complementary color development characteristic means that the types of reaction by which the electrochromic materials develop color are different from each other.

For example, if an oxidizing chromic material is used in the first chromic layer, a reducing chromic material may be used in the second chromic layer. If a reducing chromic material is used in the first chromic layer, an oxidizing chromic material may be used in the second chromic layer.

Specifically, the first chromic layer (133) may comprise a reducing chromic material, and the second chromic layer (137) may comprise an oxidizing chromic material.

The oxidizing chromic material refers to a material that changes color when an oxidation reaction takes place, and the reducing chromic material refers to a material that changes color when a reduction reaction takes place.

That is, in a chromic layer to which an oxidizing chromic material has been applied, if an oxidation reaction takes place, a coloration reaction would take place; and if a reduction reaction takes place, a decoloration reaction would take place. In a chromic layer to which a reducing chromic material has been applied, if a reduction reaction takes place, a coloration reaction would take place; and if an oxidation reaction takes place, a decoloration reaction would take place.

As such materials having complementary color development characteristics are contained in the respective chromic layers, coloration or decoloration can be simultaneously carried out in both layers. In addition, coloration or decoloration may be alternated according to the polarity of voltage applied to the electrochromic device.

In an embodiment, the first chromic layer (133) may comprise a reducing chromic material and a polymer resin.

The reducing chromic material may be one or more selected from the group consisting of titanium oxide (TiO), vanadium oxide ($V_2O_5$), niobium oxide ($Nb_2O_5$), chromium oxide ($Cr_2O_3$), manganese oxide ($MnO_2$), iron oxide ($FeO_2$), cobalt oxide ($CoO_2$), nickel oxide ($NiO_2$), rhodium oxide ($RhO_2$), tantalum oxide ($Ta_2O_5$), iridium oxide ($IrO_2$), tungsten oxide ($WO_2$, $WO_3$, $W_2O_3$, $W_2O_5$), viologen, and combinations thereof, but it is not limited thereto.

The polymer resin may be a resin having flexibility and is not limited to a specific type. For example, the polymer resin may be silicone-based resins, acrylic-based resins, phenolic-based resins, polyurethane-based resins, polyimide-based resins, or ethylene vinyl acetate-based resins, but it is not limited thereto.

For example, the first chromic layer (133) may comprise tungsten oxide ($WO_3$) and an acrylic-based resin.

The first chromic layer (133) may comprise a reducing chromic material and a polymer resin and may comprise the polymer resin in an amount of 0.1 to 15 parts by weight based on 100 parts by weight of the reducing chromic material. Specifically, it may comprise the polymer resin in an amount of 1 to 15 parts by weight or 2 to 15 parts by weight based on 100 parts by weight of the reducing chromic material, but it is not limited thereto.

If the first chromic layer comprises the polymer resin in excess of the above range based on 100 parts by weight of the reducing chromic material, the memory performance is deteriorated, whereby a certain level of transmittance cannot be maintained, as well as the chromic time taken to reach a certain transmittance is increased, and the chromic speed is decreased.

On the other hand, if the first chromic layer comprises the polymer resin less than the above range based on 100 parts by weight of the reducing chromic material, the flexibility is deteriorated, resulting in cracks when the device is deformed to a small radius of curvature, as well as it is not possible to achieve a certain level of light transmission variable function.

The first chromic layer (133) may comprise at least one layer and, if necessary, may comprise two or more layers of different materials.

The first chromic layer (133) may have a thickness of 100 nm to 1,000 nm, 200 nm to 1,000 nm, 200 nm to 800 nm, 200 nm to 700 nm, 300 nm to 700 nm, or 300 nm to 600 nm, but it is not limited thereto.

If the thickness of the first chromic layer satisfies the above range, a change in light transmittance of the light transmission variable structure may impart significant variability of light transmittance to the entire electrochromic device. As a result, the entire electrochromic device may be applied to a window of a building or a car, thereby achieving a light transmission change characteristic capable of producing an energy control effect.

The initial transmittance of the first electrode layer (131) and the first chromic layer (133) may be 90% or more. Specifically, that the initial transmittance satisfies the above range means that each of the above-described layers has been applied very uniformly and is very transparent.

The light transmittance of the second chromic layer (137) changes when a voltage is applied between the first electrode layer (131) and the second electrode layer (139). It can impart variability of light transmittance to the electrochromic device.

In an embodiment, the second chromic layer (137) may comprise an oxidizing chromic material and a polymer resin.

The oxidizing chromic material may be one or more selected from the group consisting of nickel oxide (e.g., NiO, $NiO_2$), manganese oxide (e.g., $MnO_2$), cobalt oxide (e.g., $CoO_2$), iridium-magnesium oxide, nickel-magnesium oxide, titanium-vanadium oxide, a Prussian blue-based pigment, and combinations thereof, but it is not limited thereto. The Prussian blue-based pigment is a dark blue pigment and may have a formula of $Fe_4(Fe(CN)_6)_3$.

The polymer resin may be a resin having flexibility and is not limited to a specific type. For example, the polymer resin may be a urethane acrylic-based resin, a silicone-based resin, an acrylic-based resin, an ester-based resin, an epoxy-based resin, a phenolic-based resin, a polyurethane-based resin, a polyimide-based resin, or an ethylene vinyl acetate-based resin, but it is not limited thereto.

In addition, the polymer resin may have a weight average molecular weight of 50 to 10,000. Specifically, the weight average molecular weight of the polymer resin may be 100 to 10,000, 200 to 10,000, or 500 to 10,000, but it is not limited thereto.

For example, the second chromic layer (137) may comprise nickel oxide (NiO) and an acrylic-based resin. In addition, the acrylic-based resin may have a weight average molecular weight of 50 to 10,000.

The second chromic layer (137) may comprise an oxidizing chromic material and a polymer resin and may comprise the polymer resin in an amount of 0.1 to 5 parts by weight based on 100 parts by weight of the oxidizing chromic material.

If the second chromic layer comprises the polymer resin in an amount within the above range based on 100 parts by weight of the oxidizing chromic material, the oxidizing chromic material is stably attached to the film surface, which helps to achieve smooth light transmission variable performance.

On the other hand, if the amount of the polymer resin is less than the above range, the oxidizing chromic material is weakly attached to the film surface, so that it may be detached or scattered even with a slight external impact. Further, the flexibility is also deteriorated, so that color cracks may occur when the device is bent.

In addition, if the amount of the polymer resin is greater than the above range, the ionic conductivity is impaired due to the resistance of the polymer resin itself, which may reduce the ionic conductivity performance of the oxidizing chromic material, and the durability at high temperatures may be weakened, resulting in a deterioration in reliability.

The second chromic layer (137) comprises at least one layer and, if necessary, may comprise two or more layers of different materials.

The second chromic layer (137) may have a thickness of 100 nm to 1,000 nm, 100 nm to 800 nm, 100 nm to 600 nm, 100 nm to 500 nm, 100 nm to 400 nm, 200 nm to 800 nm, or 300 nm to 800 nm, but it is not limited thereto.

If the thickness of the second chromic layer (137) satisfies the above range, the device withstands external impacts well, and an appropriate amount of ions may be retained. At the same time, it is advantageous for thinning and securing the flexibility of an electrochromic device and for achieving excellent light transmission change characteristics.

On the other hand, if the thickness of the second chromic layer is less than the above range, the chromic layer is too thin, whereby it may be difficult to properly achieve the chromic performance due to a deterioration in ionic conductivity. If the above range is exceeded, the chromic layer is too thick, whereby cracks may occur even with slight external impacts. In particular, this defect may be more pronounced during bending in the implementation of the flexible electrochromic device, as well as the manufacturing cost may be high, which is not economical.

The second chromic layer (137) may have an initial transmittance of 50% or less. Specifically, that the initial transmittance satisfies the above range means that it exhibits a dark blue or pale indigo color when viewed with the naked eye.

In an embodiment, the first chromic layer (133) comprises a reducing chromic material, the second chromic layer (137) comprises an oxidizing chromic material, and the first chromic layer and the second chromic layer may each be formed by a wet coating method.

Specifically, the first chromic layer (133) may be formed by applying a raw material to one side of the first electrode layer (131) by a wet coating method and then drying it. In addition, the second chromic layer (137) may be formed by applying a raw material to one side of the second electrode layer (139) by a wet coating method and then drying it.

The solvent used in the wet coating may be a non-aromatic solvent or an aromatic solvent, specifically, ethanol, acetone, toluene, or the like, but it is not limited thereto.

If the first chromic layer and the second chromic layer are formed by a sputtering coating method, only a very thin coating film of 100 nm or less may be formed due to the nature of the coating method, so that there is a limit to the application to an electrochromic device having both excellent light transmission variable performance and flexibility.

The thickness ratio of the first chromic layer and the second chromic layer may be 50:50 to 80:20, 55:45 to 75:25, or 60:40 to 70:30.

If the thickness ratio of the first chromic layer and the second chromic layer satisfies the above range, there is an effect that the band for color changes between transparency and darkness is wider, and the time for the color changes is shortened. On the other hand, if the above range is not satisfied, the band for color changes between transparency and darkness is very narrow, and the time for the color changes is prolonged, so that the color may change very slowly, or the electrochromic device would not work at all even if electricity is applied thereto.

The electrolyte layer (135) is a layer that serves as an ion transport path between the first chromic layer and the second chromic layer. The type of electrolyte used in the electrolyte layer is not particularly limited.

For example, the electrolyte layer may comprise hydrogen ions or Group 1 Element ions. Specifically, the electrolyte layer may comprise a lithium salt compound. The lithium salt compound may be $LiClO_4$, $LiBF_4$, $LiAsF_6$, $LiPF_6$, LiTFSI, LiFSI, or the like, but it is not limited thereto.

In addition, the electrolyte layer may comprise a polymer resin. Specifically, the electrolyte layer may comprise an acrylic-based resin, an epoxy-based resin, a silicone-based resin, a polyimide-based resin, or a polyurethane-based resin, but it is not limited thereto.

Specifically, the acrylic-based resin may be a thermosetting acrylic-based resin, a photocurable acrylic-based resin, or the like. The polyurethane-based resin may be a thermosetting polyurethane-based resin, a photocurable polyurethane-based resin, an aqueous polyurethane-based resin, or the like.

The electrolyte layer may comprise a polymer resin and a lithium salt at a weight ratio of 95:5 to 80:20, 95:5 to 85:15, or 93:7 to 87:3.

The electrolyte layer may have an ionic conductivity of $10^{-3}$ mS/cm or more. Specifically, the ionic conductivity of the electrolyte layer may be $10^{-3}$ mS/cm to $10^3$ mS/cm or $10^{-3}$ mS/cm to $10^2$ mS/cm, but it is not limited thereto.

If the ionic conductivity of the electrolyte layer is within the above range, the desired light transmission variable performance can be achieved, and it is advantageous from the viewpoint of flexibility and reliability at high temperatures. On the other hand, if the ionic conductivity of the electrolyte layer is outside the above range, the color change speed is very slow, resulting in a deterioration in the performance of the electrochromic device.

The electrolyte layer may have an adhesive strength of 200 g/inch or more. Specifically, the adhesive strength of the electrolyte layer may be 200 g/inch to 900 g/inch or 200 g/inch to 700 g/inch, but it is not limited thereto.

If the adhesive strength of the electrolyte layer is within the above range, it adheres well to both substrates so that the performance of the electrochromic device is smoothly exhibited. On the other hand, if the adhesive strength of the electrolyte layer is outside the above range, the adhesion to both substrates may be deteriorated, resulting in a detachment even with a slight external impact or stimulus, or a discontinuous surface such as delamination in an empty space or on the surface of some layers. Further, the ionic conductivity may be lowered, making it difficult to achieve a certain level of performance of the electrochromic device.

The electrolyte layer (135) may be formed by applying a raw material to one side of any one of the first chromic layer (133) or the second chromic layer (137) by a wet coating method and then drying it.

If the electrolyte layer is applied by a wet coating method, the thickness of the coating film can be increased or the thickness of the coating film can be easily controlled, which is advantageous from the viewpoint of enhancing ionic conductivity or chromic speed. On the other hand, if a sputtering coating method, rather than a wet coating method, is used for the electrolyte layer, the coating film may be easily broken or the ionic conductivity may be reduced due to the formation of a thin film.

The electrolyte layer (135) may have a thickness of 30 μm to 200 μm, 50 μm to 200 μm, 50 μm to 150 μm, 70 μm to 130 μm, or 80 μm to 120 μm. If the thickness of the electrolyte layer (135) satisfies the above range, durability is imparted to the electrochromic device. At the same time, the transport path of ions between the first chromic layer and the second chromic layer is secured in an appropriate length, whereby an appropriate speed in the light transmission change performance can be achieved.

Release Film Layer

The electrochromic device (100) according to an embodiment may further comprise a release film layer (160) on the side of the first base layer (110) opposite to the side on which the first barrier layer (120) is laminated (see FIG. 6).

The release film layer (160) may comprise a polyester-based resin comprising polyethylene terephthalate (PET), polyethylene naphthalate (PEN), or polycarbonate (PC).

Specifically, the release film layer may have a thickness of 10 μm to 100 μm, 10 μm to 80 μm, 10 μm to 50 μm, or 12 μm to 50 μm, but it is not limited thereto.

The release film layer may have a peel strength of 50 gf/inch or less. Specifically, the peel strength of the release film layer may be 3 gf/inch to 50 gf/inch or 10 gf/inch to 50 gf/inch, but it is not limited thereto.

The release film layer serves to protect the electrochromic device from external moisture or impurities during storage and transport of the electrochromic device. When the electrochromic device is later applied to a transparent window or the like, it may be used after the release film layer is removed, if necessary. The release film layer may particularly prevent a decrease in adhesive strength of the adhesive layer.

An adhesive layer (161) may be formed on one side of the release film layer.

The adhesive layer (161) may comprise an acrylic-based resin, a silicone-based resin, a polyurethane-based resin, an epoxy-based resin, or a polyimide-based resin. Specifically, the adhesive layer may comprise an acrylic resin in which case it is advantageous for enhancing the optical properties and durability.

The adhesive layer may have a blocking rate of UV rays (based on 400 nm) of 95% or more, 97% or more, 98% or more, or 99% or more, but it is not limited thereto.

In addition, the adhesive layer may have an initial adhesive strength of 0.5 N/inch to 8.0 N/inch, 1.0 N/inch to 7.0 N/inch, or 2.0 N/inch to 6.0 N/inch, but it is not limited thereto.

Primer Layer

A primer layer may be laminated on one or both sides of the first base layer (110). Specifically, a first-A primer layer (111) may be laminated on one side of the first base layer (110), and a first-B primer layer (112) may be laminated on the other side (see FIG. 6).

In addition, a primer layer may be laminated on one or both sides of the second base layer (150). Specifically, a second-A primer layer (151) may be laminated on one side of the second base layer (150), and a second-B primer layer (152) may be laminated on the other side (see FIG. 6).

In an embodiment, a primer layer may be interposed between the first barrier layer (120) and the first base layer (110). In addition, a primer layer may be interposed between the second barrier layer (140) and the second base layer (150) (see FIG. 6).

The primer layers (first-A primer layer, first-B primer layer, second-A primer layer, and second-B primer layer) may each comprise an acrylic-based resin, a polyurethane-based resin, a silicone-based resin, or a polyimide-based resin.

The primer layers (first-A primer layer, first-B primer layer, second-A primer layer, and second-B primer layer) may each have a surface tension of 35 dyne/cm$^2$ or less or a surface tension of 30 dyne/cm$^2$ or less.

The primer layers (first-A primer layer, first-B primer layer, second-A primer layer, and second-B primer layer) may each have an adhesive strength of 3.0 gf/inch or more or an adhesive strength of 3.5 gf/inch or more.

The primer layer serves to impart adhesion between the base layer and the barrier layer or to improve the refractive index. In addition, the material forming the respective primer layers, surface tension, peel strength, and the like may be the same or different.

Hard Coat Layer

The electrochromic device (100) according to an embodiment may further comprise a hard coat layer (170) on the side of the second base layer (150) opposite to the side on which the second barrier layer (140) is laminated (see FIG. 6).

The hard coat layer (170) may comprise an acrylic-based resin, a silicone-based resin, a polyurethane-based resin, an epoxy-based resin, or a polyimide-based resin.

The hard coat layer may have a thickness of 1 μm to 10 μm, 2 μm to 8 μm, 2 μm to 6 μm, or 2 μm to 5 μm, but it is not limited thereto.

The hard coat layer may have a pencil hardness of 3H or higher, 4H or higher, or 5H or higher, but it is not limited thereto.

The hard coat layer serves to protect the electrochromic device from external impacts, and it may impart excellent hardness by virtue of its resistance to scratches.

In addition, as the thickness of the hard coat layer satisfies the above range, it is possible to achieve an electrochromic device having flexibility and excellent workability. If the thickness of the hard coat layer exceeds the above range, it is difficult to achieve flexibility. If the thickness of the hard coat layer is less than the above range, it may be vulnerable to external impacts.

In a specific embodiment, the electrochromic device (100) may comprise a release film layer (160); an adhesive layer (161) on the release film layer (160); a first-B primer layer (112) on the adhesive layer (161); a first base layer (110) on the first-B primer layer (112); a first-A primer layer (111) on the first base layer (110); a first barrier layer (120) on the first-A primer layer (111); a light transmission variable structure (130) on the first barrier layer (120); a second barrier layer (140) on the light transmission variable structure (130); a second-A primer layer (151) on the second barrier layer (140); a second base layer (150) on the second-A primer layer (151); a second-B primer layer (152) on the second base layer (150); and a hard coat layer (170) on the second-B primer layer (152).

Characteristics and Application

The electrochromic device (100) may be a flexible electrochromic device.

The features such as components and properties of each layer of the electrochromic device described above may be combined with each other.

The electrochromic device (100) can be applied by simply attaching it to a structure such as a conventional transparent window. Specifically, as shown in FIG. 1, it may be attached to one side of a window. More specifically, FIG. 2 shows a cross-sectional view taken along line A-A' in FIG. 1 and an enlarged view of the part where the electrochromic device has been applied.

The electrochromic device (100) may be attached to one side of the window (10), wherein the window (10) may have a flat surface or a curved surface.

In addition, the electrochromic device (100) may be attached to the entire side of the window (10) or may be attached to only a part of the window (10).

In addition, the electrochromic device (100) may be inserted into the window (10). Specifically, the electrochromic device may be applied through a method of interposing it between glass substrates. More specifically, it can be applied in a way in which two polyvinyl butyral (PVB) films are interposed between laminated glasses of a window, and the electrochromic device is interposed between the two PVB films. It can be stably inserted into the window as it tightly attaches by applying heat.

The electrochromic device (100) may have a thickness of 20 μm to 1,000 μm. Specifically, the thickness of the electrochromic device (100) may be 25 μm to 900 μm, 25 μm to 800 μm, 25 μm to 700 μm, 25 μm to 600 μm, or 25 μm to 500 μm, but it is not limited thereto.

The electrochromic device may have a transmittance for visible light of 10% to 40%, 10% to 30%, or 10% to 20%, when coloration is maximally driven, but it is not limited thereto.

In addition, the electrochromic device may have a transmittance for visible light of 40% to 90%, 50% to 90%, or 60% to 80%, when decoloration is maximally driven, but it is not limited thereto.

The electrochromic device may control the transmittance for infrared rays (IR rays) and ultraviolet rays (UV rays) as well as visible light during coloration and decoloration.

When electric power is applied to the electrochromic device, an electric field is formed between the two electrodes, giving rise to coloration and decoloration, so that the transmittance can be adjusted for each wavelength of sunlight. Thus, an insulation function and a shading function can be advantageously achieved.

In addition, the electrochromic device can be fabricated in a large area at a low cost, and its power consumption is low. Thus, it is suitable for use as a smart window, a smart mirror, or other next-generation architectural window materials.

Since the electrochromic device (100) is thin in thickness and lightweight and has flexible characteristics, it has excellent workability and a low possibility of breakage, it can be stored in the form of a roll, and it is convenient to transport.

MODE FOR THE INVENTION

Hereinafter, the present invention will be described in more detail with reference to the following examples. However, these examples are set forth to illustrate the present invention, and the scope of the present invention is not limited thereto.

Example 1: Fabrication of an Electrochromic Device

Two transparent electrode substrates on which an ITO electrode having a surface resistance of 50 Ω/sq, a barrier layer, a primer layer, and a PET base layer (thickness: 100 µm) had been laminated were used as upper and lower plates, respectively. A tungsten oxide ($WO_3$) was applied to the lower ITO electrode through wet coating and dried at 120° C. for 2 minutes to form a reducing chromic layer (thickness: 400 nm). Thereafter, a coating solution for an oxidizing chromic layer to be coated on the upper ITO electrode was prepared as a nickel oxide (NiO) paste by mixing an acrylic-based resin dissolved in ethanol. Here, in the coating solution for an oxidizing chromic layer, 5 parts by weight of the acrylic-based resin was employed based on 100 parts by weight of nickel oxide (NiO). Thereafter, the coating solution for an oxidizing chromic layer was applied to the upper ITO electrode through wet coating and dried at 120° C. for 2 minutes to form an oxidizing chromic layer (thickness: 400 nm). A gel electrolyte in a thickness of 100 µm was interposed between the reducing chromic layer and the oxidizing chromic layer, and the upper and lower plates were laminated to prepare an electrochromic device sample (10 cm×10 cm). Subsequently, copper tapes were attached to the sides of the upper and lower plates to form a bus bar for power connection.

Examples 2 to 6 and Comparative Examples 1 and 2

An electrochromic device sample was prepared in the same manner as in Example 1, except that the thicknesses of the base layer, the coating method for the reducing chromic layer, the thickness of the oxidizing chromic layer, the weight of the acrylic-based resin in the oxidizing chromic layer were changed as shown in Table 1 below.

The following properties of the electrochromic devices fabricated in Examples 1 to 6 and Comparative Examples 1 and 2 were measured and evaluated, and the results are shown in Table 1.

Evaluation Example 1: Ionic Conductivity of the Electrolyte Layer

Bulk resistance was measured at 1 Hz to 100 KHz using an AC impedance analyzer at 25° C., and the ionic conductivity of the electrolyte layer was obtained by converting it with the thickness.

Evaluation Example 2: Adhesive Strength of the Electrolyte Layer

The electrolyte layer was laminated between transparent electrode substrates using a 1 kg roller. After 20 minutes, a 90-degree peel test (ASTM D 1876) was performed. The peel test was carried out using a universal testing machine (Instron 34SC-5) at a speed of 300 mm/min. Here, the adhesive strength of the electrolyte layer was measured when the sample was broken by pulling it at a 90-degree angle.

Evaluation Example 3: Evaluation of Flexibility

When the electrochromic device sample was left for 24 hours in a state of being wound such that the radius of curvature was 50 R and then unfolded, the light transmittance variable performance was measured using a transmittance meter (model WP-4500, manufacturer: EDTM, WP-4500). As a result of the measurement, it was evaluated as ○ when color cracks did not occur, and x when color cracks occurred.

Evaluation Example 4: Evaluation of Reliability

When the electrochromic device sample was left for 24 hours at a temperature of 100° C. and then unfolded, the light transmittance variable performance was measured using a transmittance meter (model WP-4500). As a result of the measurement, it was evaluated as ○ when the chromic rate was operated at more than 80% of the initial value, Δ when operated at 50% to 80%, and x when operated at less than 50%.

Evaluation Example 5: Evaluation of Elongation and Tensile Strength

The electrochromic device sample was cut to a size of 15 mm×150 mm and mounted in a UTM (INSTRON, 5566A). The measurement conditions were set to a speed of 200 mm/min, a measurement length of 50 mm, and a width of 15 mm. The elongation and tensile strength of five samples were measured under the same conditions, and the average values thereof are shown in Table 1 below.

Specifically, the elongation is expressed as a percentage of how much the sample is stretched based on the point at which the sample is broken during a tensile test thereof. It is a value (unit: %) determined by the equation of $[(L_1-L_0)/L_0] \times 100(\%)$ when the initial gage distance of a sample is $L_0$ and the gage distance upon fracture is $L_1$. It was measured according to the ASTM D 638 standard.

In addition, the tensile strength is a value (unit: $kgf/mm^2$) measured by dividing the maximum tensile load until the sample is broken during a tensile test thereof by the cross-sectional area of the sample before the test. It was measured according to the ASTM D 638 standard.

TABLE 1

| | Ex. 1 | Ex. 2 | Ex. 3 | Ex. 4 | Ex. 5 | Ex. 6 | C. Ex. 1 | C. Ex. 2 |
|---|---|---|---|---|---|---|---|---|
| Thickness of base layer (μm) | 100 | 125 | 150 | 125 | 125 | 150 | 40 | 200 |
| Elongation (%) | 138.43 | 116.33 | 83.37 | 114 | 110 | 85.7 | 172.9 | 50.1 |
| Tensile strength (kgf/mm$^2$) | 310.93 | 269.3 | 211.37 | 261 | 263 | 315 | 111.37 | 380.4 |
| Method of coating oxidizing chromic layer | wet | wet | wet | wet | sputtering | wet | wet | wet |
| Thickness of oxidizing chromic layer (nm) | 400 | 400 | 400 | 200 | 100 | 200 | 400 | 400 |
| Content of acrylic resin in oxidizing chromic layer (part by weight)* | 5 | 5 | 5 | 0.05 | 0 | 7 | 5 | 5 |
| Ion conductivity of electrolyte layer (mS/cm) | 10$^{-3}$ or more | 10$^{-3}$ or more | 10$^{-3}$ or more | 10$^{-4}$ or less | 10$^{-5}$ or less | 10$^{-6}$ or less | 10$^{-3}$ or more | 10$^{-3}$ or more |
| Adhesive strength of electrolyte layer (g/inch) | 217 | 220 | 240 | 50 | 10 | 240 | 233 | 227 |
| Flexibility | ○ | ○ | ○ | x | x | ○ | ○ | x |
| Reliability | ○ | ○ | ○ | ○ | ○ | Δ | x | ○ |

*The weight of the acrylic-based resin in the oxidizing chromic layer was in part by weight of the acrylic-based resin based on 100 parts by weight of nickel oxide (NiO).

As can be seen from Table 1, the electrochromic devices of Examples 1 to 6 satisfied an elongation of 60% to 170% and a tensile strength of 120 kgf/mm$^2$ to 350 kgf/mm$^2$, so that they were flexible without deformation or cracks in the electrode layer or the chromic layer.

In addition, since the electrochromic devices according to Examples 1 to 6 achieved a certain level of light transmission variable performance even at high temperatures, there would be almost no deterioration in the performance even in summer when hot solar energy is received. Thus, it can be readily applied to a window, and the durability can be maintained even at high temperatures.

In particular, since the electrochromic devices according to Examples 1 to 3 not only satisfied specific levels of elongation and tensile strength, but also showed excellent results in flexibility evaluation, they can be deformed even to a level of a small radius of curvature without a deterioration in performance. Further, they can be maintained in the form of a roll having a small radius of curvature, thereby reducing logistics costs, and it is very convenient for storage and transportation.

In contrast, the electrochromic device according to Comparative Example 1 had an elongation exceeding 170% and a tensile strength less than 120 kgf/mm$^2$, it was so flexible that the film would be easily bent, whereby cracks may be formed in the electrode layer or chromic layer, and the pieces may be broken and detached in severe cases.

In addition, the electrochromic device according to Comparative Example 2 had an elongation less than 60% or a tensile strength exceeding 350 kgf/mm$^2$, its flexibility, which is the main characteristic, would be little exhibited when applied as a flexible electrochromic device, and whitening such as white streaks may occur at the bent boundary when forced to be bent.

The invention claimed is:

1. An electrochromic device, which comprises a light transmission variable structure interposed between a first base layer and a second base layer,
   wherein the light transmission variable structure comprises a first chromic layer and a second chromic layer, an electrolyte layer is interposed between the first chromic layer and the second chromic layer,
   wherein an elongation of the electrochromic device is 60% to 170%,
   wherein the second chromic layer comprises an oxidizing chromic material and a polymer resin,
   wherein the second chromic layer comprises 0.1 to 5 parts by weight of the polymer resin relative to 100 parts by weight of the oxidizing chromic material,
   wherein the electrochromic device comprises a first barrier layer and a second barrier layer, and the first barrier layer and the second barrier layer each comprises at least one selected from the group consisting of metal oxides, metal nitrides, metal oxynitrides, metalloid oxides, metalloid nitrides, metalloid oxynitrides, and combinations thereof,
   wherein the polymer resin is one or more selected from the group consisting of a urethane acrylic-based resin, a silicone-based resin, an acrylic-based resin, an ester-based resin, an epoxy-based resin, a phenolic-based resin, a poly urethane-based resin, a polyimide-based resin, and an ethylene vinyl acetate-based resin, and
   wherein the oxidizing chromic material is one or more selected from the group consisting of nickel oxide, manganese oxide, cobalt oxide, iridium-magnesium oxide, nickel-magnesium oxide, titanium-vanadium oxide, a Prussian blue based pigment, and combinations thereof.

2. The electrochromic device of claim 1, which has a tensile strength of 120 kgf/mm2 to 350 kgf/mm2.

3. The electrochromic device of claim 1, wherein the thickness of the second chromic layer is 100 nm to 1,000 nm.

4. The electrochromic device of claim 1, wherein the first chromic layer comprises a reducing chromic material, and the first chromic layer and the second chromic layer are each formed by a wet coating method.

5. The electrochromic device of claim 1, wherein the electrolyte layer has an ionic conductivity of 10-3 mS/cm or more.

6. The electrochromic device of claim 1, wherein the electrolyte layer has an adhesive strength of 200 g/inch or more.

7. The electrochromic device of claim 1, wherein the first base layer and the second base layer each comprise one or more selected from the group consisting of polyethylene terephthalate (PET), polyethylene naphthalate (PEN), polycarbonate (PC), polyimide (PI), polycyclohexylenedimethylene terephthalate (PCT), polyethersulfone (PES), nylon, polymethyl methacrylate (PMMA), and cycloolefin polymer (COP).

8. The electrochromic device of claim 1, wherein the first base layer has a thickness of 50 μm to 180 μm, and the second base layer has a thickness of 50 μm to 180 μm.

\* \* \* \* \*